(12) United States Patent
Akuzawa

(10) Patent No.: US 10,124,794 B2
(45) Date of Patent: Nov. 13, 2018

(54) VEHICLE AND CONTROL METHOD THEREFOR

(71) Applicant: TOYOTA JIDOSHA KABUSHIKI KAISHA, Toyota-shi, Aichi-ken (JP)

(72) Inventor: Ken Akuzawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/643,653

(22) Filed: Jul. 7, 2017

(65) Prior Publication Data

US 2018/0009431 A1 Jan. 11, 2018

(30) Foreign Application Priority Data

Jul. 8, 2016 (JP) ................... 2016-135918

(51) Int. Cl.
  *F02D 29/06* (2006.01)
  *H02P 9/04* (2006.01)
  (Continued)

(52) U.S. Cl.
  CPC ............... *B60W 20/15* (2016.01); *B60K 6/40* (2013.01); *B60K 6/46* (2013.01); *B60K 6/485* (2013.01); *B60L 1/00* (2013.01); *B60L 11/14* (2013.01); *B60L 11/1861* (2013.01); *B60L 15/20* (2013.01); *B60W 10/06* (2013.01); *B60W 10/08* (2013.01); *B60W 30/18018* (2013.01); *B60W 30/18127* (2013.01); *F02N 11/0814* (2013.01); *F02N 11/0862* (2013.01); *F02N 19/005* (2013.01); *B60L 2240/441* (2013.01);
  (Continued)

(58) Field of Classification Search
  USPC ......................... 290/1 A, 30 R, 40 B; 322/11
  See application file for complete search history.

(56) References Cited

U.S. PATENT DOCUMENTS 2,887,588 A * 5/1959 Williams ................ F02N 11/08
                                                                  123/179.2
5,561,330 A * 10/1996 Crook .................. F02N 11/0803
                                                                    290/30 R
(Continued)

FOREIGN PATENT DOCUMENTS

EP        1 489 295 A2    12/2004
JP        2011-031870 A    2/2011
(Continued)

*Primary Examiner* — Pedro J Cuevas
(74) *Attorney, Agent, or Firm* — Finnegan, Henderson, Farabow, Garrett & Dunner, LLP

(57) ABSTRACT

A first electric power generation device configured to produce an accessory voltage according to a first instruction voltage. A second electric power generation device configured to produce the accessory voltage according to a second instruction. An electric control unit is configured to execute crank position stop control for stopping a crank of the engine at a target position when the engine is stopped by controlling the first electric power generation device such that a current is circulated in the first electric power generation device and the rotating electric machine generates braking torque. The electric control unit is configured to execute the crank position stop control in a state in which the second instruction voltage is equal to or higher than the first instruction voltage.

7 Claims, 12 Drawing Sheets

(51) Int. Cl.

| | |
|---|---|
| *B60W 20/15* | (2016.01) |
| *B60K 6/40* | (2007.10) |
| *B60K 6/46* | (2007.10) |
| *B60L 1/00* | (2006.01) |
| *B60W 10/06* | (2006.01) |
| *B60W 10/08* | (2006.01) |
| *B60W 30/18* | (2012.01) |
| *B60K 6/485* | (2007.10) |
| *B60L 11/14* | (2006.01) |
| *B60L 11/18* | (2006.01) |
| *B60L 15/20* | (2006.01) |
| *F02N 11/08* | (2006.01) |
| *F02N 19/00* | (2010.01) |
| *F02B 63/04* | (2006.01) |
| *F02N 11/04* | (2006.01) |

(52) U.S. Cl.
CPC ... *B60L 2240/443* (2013.01); *B60L 2240/547* (2013.01); *B60L 2260/26* (2013.01); *B60W 2510/30* (2013.01); *B60W 2710/06* (2013.01); *B60W 2710/305* (2013.01); *B60Y 2200/92* (2013.01); *B60Y 2300/18125* (2013.01); *B60Y 2300/192* (2013.01); *B60Y 2300/45* (2013.01); *B60Y 2300/60* (2013.01); *B60Y 2400/60* (2013.01); *F02N 11/04* (2013.01); *F02N 11/0866* (2013.01); *F02N 2011/0885* (2013.01); *F02N 2011/0888* (2013.01); *F02N 2011/0896* (2013.01); *F02N 2019/008* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7275* (2013.01); *Y10S 903/93* (2013.01); *Y10S 903/951* (2013.01)

(56) References Cited

U.S. PATENT DOCUMENTS

| | | | | |
|---|---|---|---|---|
| 5,731,688 | A * | 3/1998 | Thomson | H02J 3/38 290/40 B |
| 6,166,525 | A * | 12/2000 | Crook | F02N 11/0803 290/30 B |
| 6,603,097 | B2 * | 8/2003 | Leisner | B23K 9/1006 219/133 |
| 7,228,209 | B2 * | 6/2007 | Izawa | B60K 6/445 701/22 |
| 8,319,357 | B2 * | 11/2012 | Usselman | F02B 63/04 290/1 A |
| 9,694,809 | B2 * | 7/2017 | Ang | B60W 20/40 |
| 2004/0255904 | A1 * | 12/2004 | Izawa | B60K 6/445 123/352 |
| 2011/0025127 | A1 | 2/2011 | Choi et al. | |
| 2015/0377162 | A1 | 12/2015 | Kamioka et al. | |
| 2016/0336887 | A1 | 11/2016 | Murakami et al. | |

FOREIGN PATENT DOCUMENTS

| | | |
|---|---|---|
| JP | 2013-95246 | 5/2013 |
| JP | 2013-124082 A | 6/2013 |
| JP | 2013-124083 A | 6/2013 |
| JP | 2015-139242 A | 7/2015 |
| WO | WO2014/174567 A1 | 10/2014 |

* cited by examiner

VEHICLE AND CONTROL METHOD THEREFOR

INCORPORATION BY REFERENCE

The disclosure of Japanese Patent Application No. 2016-135918 filed on Jul. 8, 2016 including the specification, drawings and abstract is incorporated herein by reference in its entirety.

BACKGROUND

1. Technical Field

The present disclosure relates to a vehicle and a control method therefor, and in particular, a vehicle including an engine and an electric power generation device configured to receive torque from a crankshaft of the engine to produce an accessory voltage, and a control method therefor.

2. Description of Related Art

Japanese Patent Application Publication No. 2013-95246 (JP 2013-95246 A) discloses an electric power supply device for a vehicle including an alternator connected to an engine. The electric power supply device for a vehicle includes the alternator, a first electric power supply system having a low voltage battery, a second electric power supply system having a high voltage battery, and a DC/DC converter provided between the first electric power supply system and the second electric power supply system. In this electric power supply device, an output voltage and an output current of the DC/DC converter are set, and the engine and the alternator are controlled such that a voltage of the first electric power supply system does not fall below a lower limit voltage (see JP 2013-95246 A).

SUMMARY

In a hybrid vehicle, a vehicle having a stop and start function, or the like, when an engine is stopped during traveling or temporary stopping, such as waiting for a traffic signal, in order to increase startability of the engine at the time of next engine operation, crank position stop control for stopping a crank (crank angle) of the engine at a predetermined position may be executed. In the crank position stop control, in an electric power generation device (alternator, integrated starter generator (ISG), or the like) which is connected to a crankshaft of the engine to produce accessory electric power, regenerative torque (braking torque) is generated compulsorily by circulating a current in the electric power generation device, thereby stopping the crank (crank angle) at the predetermined position.

If the crank position stop control is executed, a rotation speed of the electric power generation device is rapidly lowered by the braking torque, and as a result, an output voltage of the electric power generation device is rapidly lowered. Therefore, the accessory voltage is rapidly lowered, and an operation of an accessory is likely to become unstable. Such a problem has not been examined in particular in JP 2013-95246 A described above.

An object is to provide a vehicle capable of suppressing rapid fluctuation of an accessory voltage accompanied by crank position stop control, and a control method therefor.

A vehicle according to a first aspect includes an engine, first and second electric power generation devices, and an electric control unit. The first electric power generation device includes a rotating electric machine coupled to a crankshaft of the engine and is configured to produce an accessory voltage according to a first, instruction voltage, using torque that the rotating electric machine receives from the crankshaft. The second electric power generation device is configured to produce the accessory voltage according to a second instruction voltage using a voltage source different from the rotating electric machine without using the torque of the crankshaft. The electric control unit is configured to execute crank position stop control for stopping a crank of the engine at a target position when the engine is stopped by controlling the first electric power generation device such that a current is circulated in the first electric power generation device and the rotating electric machine generates braking torque. The electric control unit is configured to execute the crank position stop control in a state in which the second instruction voltage is equal to or higher than the first instruction voltage.

If the crank position stop control is executed, since a rotation speed of the rotating electric machine is rapidly lowered by the braking torque of the rotating electric machine, an output voltage of the first electric power generation device is rapidly lowered. Since the accessory voltage is constrained by an output of an electric power generation device having a higher instruction voltage out of the first and second instruction voltages, if the first instruction voltage is higher than the second instruction voltage at the time of the start of the crank position stop control, the accessory voltage is rapidly lowered from a level of the first instruction voltage to a level of the second instruction voltage. Accordingly, in this vehicle, the crank position stop control is executed in a state in which second instruction voltage is equal to or higher than the first instruction voltage. With this, since the accessory voltage is constrained by an output of the second electric power generation device at the time of the start of the crank position stop control, the accessory voltage is not lowered even if the output voltage of the first electric power generation device is rapidly lowered accompanied by the start of the crank position stop control. Therefore, according to this vehicle, it is possible to suppress fluctuation of the accessory voltage accompanied by the crank position stop control.

In the first aspect, the electric control unit may be configured to, when the first instruction voltage is higher than the second instruction voltage before executing the crank position stop control, execute the crank position stop control after increasing the second instruction voltage to the first instruction voltage.

According to this aspect, when the first instruction voltage is higher than the second instruction voltage before executing the crank position stop control, since the relatively low second instruction voltage increases to the first instruction voltage, it is possible to suppress fluctuation of the accessory voltage accompanied by change in the second instruction voltage before executing the crank position stop control.

In the first aspect, the electric control unit may be configured to, when the first instruction voltage is higher than the second instruction voltage before executing the crank position stop control, execute the crank position stop control after decreasing the first instruction voltage to be equal to or lower than the second instruction voltage at a predetermined rate.

According to the first aspect, when the first instruction voltage is higher than the second instruction voltage before executing the crank position stop control, since the relatively high first instruction voltage decreases to be equal to or lower than the second instruction voltage at the predetermined rate, it is possible to suppress rapid fluctuation of the accessory voltage accompanied by change in the first instruction voltage before executing the crank position stop control.

In the first aspect, the vehicle may further include an electric motor configured to produce drive power of the vehicle, and an electric power storage device configured to store electric power supplied to the electric motor. The second electric power generation device may include a converter configured to deboost a voltage of electric power supplied from the electric power storage device to produce the accessory voltage.

A control method for a vehicle according to a second aspect is applied to a vehicle including an engine, a first electric power generation device including a rotating electric machine connected to a crankshaft of the engine, the first electric power generation device being configured to produce an accessory voltage according to a first instruction voltage, using torque that the rotating electric machine receives from the crankshaft, and a second electric power generation device configured to produce the accessory voltage according to a second instruction voltage using a voltage source different from the rotating electric, machine without using the torque of the crankshaft. The control method for a vehicle includes, when the engine is stopped, determining whether or not the second instruction voltage is equal to or higher than the first instruction voltage, and when it is determined that the second instruction voltage is equal to or higher than the first instruction voltage, executing crank position stop control for stopping a crank of the engine at a target position when the engine is stopped by controlling the first electric power generation device such that a current is circulated in the first electric power generation device and the rotating electric machine generates braking torque.

In the first aspect and the second aspect, in a hybrid vehicle including an electric motor configured to produce drive power of the vehicle along with an engine, the engine repeats stop and start according to the drive power of the vehicle, charging state of the electric power storage device, or the like. These aspects are applied to such a hybrid vehicle, and in the hybrid vehicle in which the engine repeats stop and start, it is possible to suppress rapid fluctuation of the accessory voltage accompanied by the crank position stop control when the engine is stopped.

According to the first aspect and the second aspect, it is possible to provide a vehicle capable of suppressing fluctuation of the accessory voltage accompanied by the crank position stop control, and a control method therefor.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
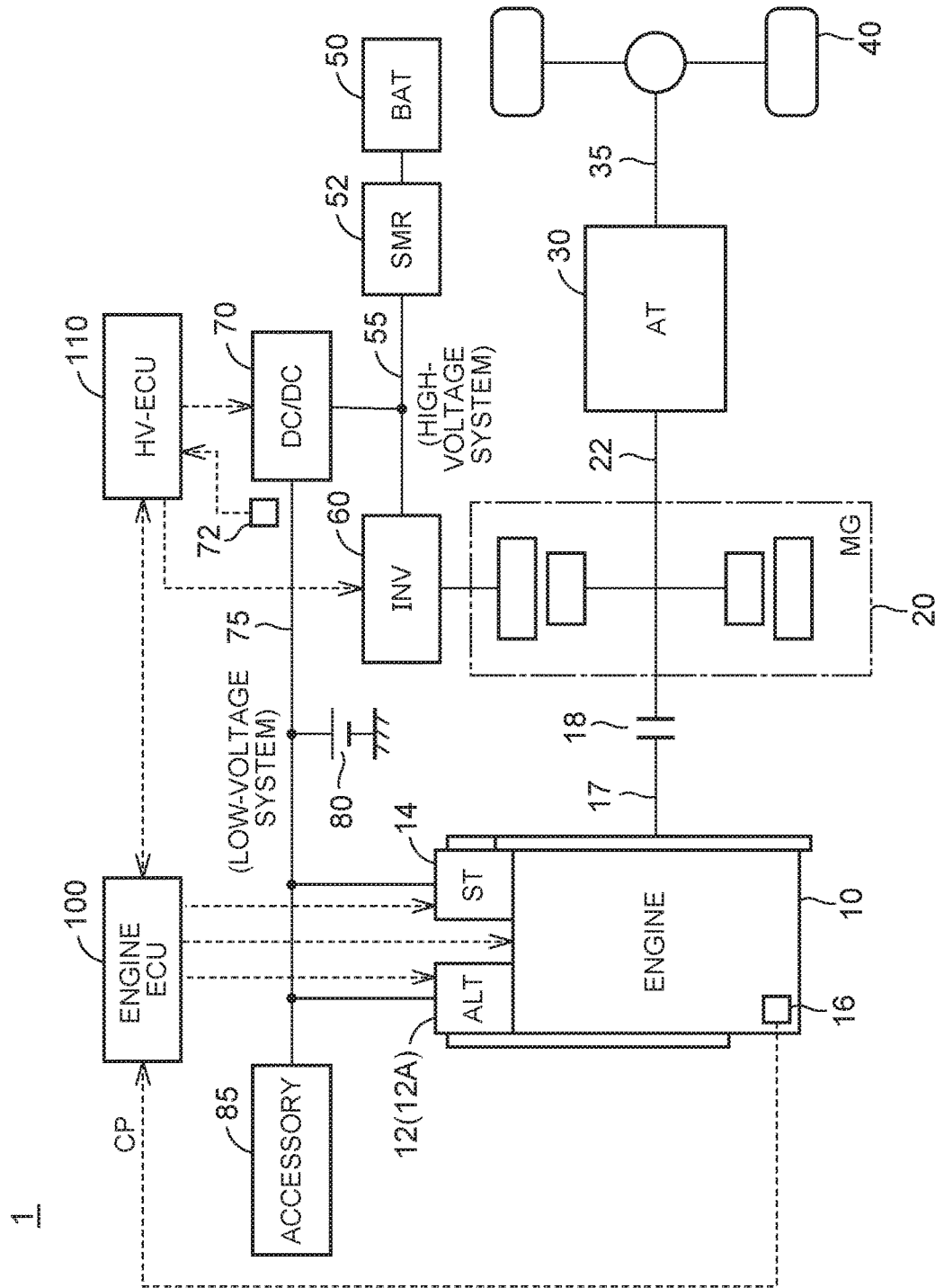
FIG. 1 is an overall configuration diagram of a vehicle according to Embodiment 1.

Hereinafter, an embodiment will be described in detail referring to the drawings. The same or similar portions in the drawings are represented by the same reference numerals, and description thereof will not be repeated.

Embodiment 1

FIG. 1 is an overall configuration diagram of a vehicle according to Embodiment 1. Referring to FIG. 1, a vehicle 1 includes an engine 10, an alternator 12, a starter 14, a crank position sensor 16, a clutch 18, a motor generator (hereinafter, referred to as an "MG") 20, an automatic transmission (hereinafter, referred to as an "AT") 30, and drive wheels 40.

The vehicle 1 according to Embodiment 1 is a hybrid vehicle which travels using power of at least one of the engine 10 or the MG 20. A crankshaft 17 which is an output shaft of the engine 10 is connected to an input shaft (hereinafter, referred to as an "AT input shaft") 22 of the AT 30 through the clutch 18. A rotor of the MG 20 is connected to the AT input shaft 22. An output shaft (hereinafter, referred to as an "AT output shaft") 35 of the AT 30 is connected to the drive wheels 40 through a differential gear.

The engine 10 is an internal combustion engine, and is, for example, a gasoline engine, a diesel engine, or the like. The engine 10 converts energy produced by combustion of an air-fuel mixture of air and fuel to reciprocating motion of a piston, converts reciprocating motion to rotational motion with a crank mechanism, and outputs rotational motion to the crankshaft 17.

The MG 20 is an AC motor generator, and for example, a three-phase AC synchronous motor in which a permanent magnet is embedded in a rotor. The MG 20 is driven by an inverter 60 (described below), produces torque for driving the vehicle 1, and outputs torque to the AT input shaft 22. The MG 20 can receive torque (an output of the engine 10 or torque transmitted from the drive wheels 40 through the AT 30) from the AT input shaft 22 to generate electric power.

The AT 30 is configured to change the ratio (gear ratio) of a rotation speed of the AT input shaft 22 to a rotation speed of the AT output shaft 35. The AT 30 may be a stepped automatic transmission capable of changing the gear ratio in a stepwise manner, or a continuously variable automatic transmission.

In the vehicle 1, the clutch 18 is released (power shutoff), whereby traveling can be performed only using the drive power of the MG 20. The clutch 18 is engaged (power transmission), whereby traveling can be performed using the drive power of both of the engine 10 and the MG 20. In a state in which the clutch 18 is engaged, the MG 20 may be brought into a non-driven state and traveling may be performed only using the power of the engine 10, or electric power may be generated by the MG 20 while performing traveling using the power of the engine 10.

The alternator 12 is connected to the crankshaft 17 of the engine 10 through a belt, and generates accessory electric power using the power of the engine 10. Specifically, the alternator 12 receives torque from the crankshaft 17 of the engine 10 to generate electric power and outputs electric power subjected to voltage regulation to an instruction voltage (for example, 12 V to 15 V) received from the engine ECU 100 (described below) to a low-voltage system electric power line 75.

The alternator 12 generates regenerative torque (braking torque) compulsorily by circulating a current in the alternator 12 when the engine 10 is stopped, thereby applying braking to the crankshaft 17 to stop the crankshaft 17 at a desired target position (crank position stop control). The configuration of the alternator 12 and the crank position stop control will be described below in detail.

The starter 14 is connected to the crankshaft 17 of the engine 10 through a gear mechanism, and receives electric power from the electric power line 75 at the time of the start of the engine 10 to generate torque. The generated torque is transmitted to the crankshaft 17 through the gear mechanism, and the engine 10 is cranked. The crank position sensor 16 detects a crank position CP indicating a rotation position (rotation angle) of the crankshaft 17 and outputs a detection value to the engine ECU 100.

The vehicle 1 further includes an electric power storage device 50, a system main relay (hereinafter, referred to as an "SMR") 52, an inverter 60, a DC/DC converter 70, an accessory battery 80, an accessory 85, a voltage sensor 72, an engine electronic control unit (ECU) 100, and an HV-ECU 110.

The electric power storage device 50 is a rechargeable DC power supply, and includes, for example, a secondary battery, such as a nickel-hydrogen battery or a lithium-ion battery. The electric power storage device 50 can supply electric power to the inverter 60 and the DC/DC converter 70 through a high-voltage system electric power line 55. The electric power storage device 50 is charged with generated electric power received through the inverter 60 and the electric power line 55 at the time of electric power generation of the MG 20. A voltage of the electric power storage device 50 is, for example, about 200 V. As the electric power storage device 50, a large-capacity capacitor can also be employed.

The SMR 52 is provided between the electric power storage device 50 and the electric power line 55. For example, if a user operates a power switch (not shown) in a state of depressing a brake pedal, the SMR 52 is brought into a conduction state according to a control signal from the HV-ECU 110, and the vehicle 1 is brought into a "Ready-ON state" and is capable of traveling.

The inverter 60 is provided between the electric power line 55 and the MG 20, and drives the MG 20 based on a control signal from the HV-ECU 110. The inverter 60 can receive electric power from the electric power storage device 50 through the electric power line 55 to drive the MG 20 in a powering state. The inverter 60 can rectify electric power generated by the MG 20 and output electric power to the electric power storage device 50 through the electric power line 55 (regenerative charging). The inverter 60 is constituted of, for example, a bridge circuit including switching elements for three phases.

The DC/DC converter 70 is connected between the high-voltage system electric power line 55 and the low-voltage system electric power line 75, and receives electric power from the electric power line 55 to generate accessory electric power. Specifically, the DC/DC converter 70 converts electric power received from the electric power storage device 50 through the high-voltage system electric power line 55 to electric power subjected to voltage regulation to the instruction voltage (for example, 12 V to 15 V) from the HV-ECU 110 and outputs electric power to the low-voltage system electric power line 75. The DC/DC converter 70 is, for example, an insulating converter including a DC/AC conversion circuit, a transformer, a rectifier circuit, and a smoothing circuit.

The accessory battery 80 is a rechargeable DC power supply, and includes, for example, a lead storage battery. The accessory battery 80 can supply electric power to the accessory 85 and the starter 14 through the electric power line 75. The accessory battery 80 is charged with electric power received from the DC/DC converter 70 and/or the alternator 12 through the electric power line 75. A voltage of the accessory battery 80 is, for example, about 12 V.

The accessory 85 collectively indicates various accessories (excluding the alternator 12, the starter 14, and the DC/DC converter 70) mounted in the vehicle 1. The voltage sensor 72 detects a voltage of the low-voltage system electric power line 75 and outputs a detection value to the HV-ECU 110.

The engine ECU 100 includes a central processing unit (CPU), a read only memory (ROM) which stores a processing program or the like, a random access memory (RAM) which temporarily stores data, and an input/output port which is provided to input and output various signals, and the like (all are not shown), and executes various kinds of control of the engine 10.

As one of principal control by the engine ECU 100, the engine ECU 100 controls the alternator 12 during the operation of the engine 10. The engine ECU 100 sets an instruction voltage (hereinafter, referred to as a "first instruction voltage") indicating a target output voltage of the alternator 12 and outputs the first instruction voltage to the alternator 12. The first instruction voltage is set as appropriate according to a traveling state of the vehicle 1, a load state of the accessory 85, or the like such that electric power generation efficiency of the alternator 12 becomes satisfactory.

The engine ECU 100 executes the crank position stop control for applying braking to the crankshaft 17 of the engine 10 by the alternator 12 to stop the crankshaft 17 at a desired target position when the engine 10 is stopped. Specifically, the engine ECU 100 controls the alternator 12 such that a current is circulated in the alternator 12, whereby regenerative torque (braking torque) is generated compulsorily in the alternator 12, and the crank is stopped at a predetermined position based on the detection value of the crank position (crank angle).

The crank position stop control is executed in order to increase engine startability at the time of a next engine operation. That is, when the engine 10 is stopped, the crank of the crankshaft 17 is stopped at a target position set in advance, whereby it is possible to increase engine startability at the time of the next engine operation. Like the vehicle 1 according to Embodiment 1, in the hybrid vehicle which the engine 10 repeats stop and operation according to a traveling situation, a charging state (state of charge (SOC)) of the electric power storage device 50, or the like, particularly satisfactory engine startability is required.

The HV-ECU 110 also includes a CPU, a ROM which stores a processing program, or the like, a RAM which temporarily stores data, an input/output port which is provided to input and output various signals, and the like (all are not shown), and executes various kinds of control for integrally controlling the vehicle 1.

As one of principal control by the HV-ECU 110, the HV-ECU 110 controls the DC/DC converter 70 such that accessory electric power is supplied from the high-voltage system electric power line 55 to the low-voltage system electric power line 75 through the DC/DC converter 70. The HV-ECU 110 sets an instruction voltage (hereinafter, referred to as a "second instruction voltage") indicating a target output voltage of the DC/DC converter 70 and outputs the second instruction voltage to the DC/DC converter 70. The second instruction voltage is set as appropriate according to the load state of the accessory 85 or the like such that conversion efficiency of the DC/DC converter 70 becomes satisfactory.

Communication is performed between the engine ECU 100 and the HV-ECU 110 through a controller area network (CAN) or the like, and information is exchanged as appropriate.

In the vehicle 1, if the crank position stop control is executed by the engine ECU 100, a current is circulated in the alternator 12, whereby the alternator 12 generates compulsory braking torque and a rotation speed of the alternator 12 is rapidly lowered. For this reason, if the crank position stop control is executed, the output voltage of the alternator 12 is rapidly lowered (since the current is circulated in the alternator 12, the output voltage of the alternator 12 basically becomes zero immediately). Since the voltage (accessory voltage) of the low-voltage system electric power line 75 is a higher voltage out of the output voltage of the alternator 12 according to the first instruction voltage and the output voltage of the DC/DC converter 70 according to the second instruction voltage, if the first instruction voltage is higher than the second instruction voltage at the time of the start of the crank position stop control, a voltage of the electric power line 75 is rapidly lowered from a level of the first instruction voltage to a level of the second instruction voltage. If the voltage of the electric power line 75 is rapidly lowered, the operation of the accessory 85 is likely to become unstable.

Accordingly, in the vehicle 1 according to Embodiment 1, in a state in which the second instruction voltage (the target output voltage of the DC/DC converter 70) is equal to or higher than the first instruction voltage (the target output voltage of the alternator 12), the crank position stop control is executed by the engine ECU 100. With this, since the voltage of the electric power line 75 is constrained by an output of the DC/DC converter 70 at the time of the start of the crank position stop control, the voltage (accessory voltage) of the electric power line 75 is not lowered even if the output voltage of the alternator 12 is rapidly lowered accompanied by the start of the crank position stop control.

Therefore, according to the vehicle 1, it is possible to suppress fluctuation of the accessory voltage accompanied by the crank position stop control.

Then, in the vehicle 1 according to Embodiment 1, when the first instruction voltage is higher than the second instruction voltage before the crank position stop control is executed, the HV-ECU 110 increases the second instruction voltage to the first instruction voltage according to an instruction from the engine ECU 100. If the second instruction voltage increases to the first instruction voltage, the crank position stop control is executed in the engine ECU 100. When the first instruction voltage is higher than the second instruction voltage before the crank position stop control is executed, it is possible to suppress fluctuation of the accessory voltage accompanied by change in the second instruction voltage, since the relatively low second instruction voltage increases to the first instruction voltage.

When the crank position stop control is not executed when the engine 10 is stopped, the problem of rapid voltage fluctuation described above does not occur. This is because, when the crank position stop control is not executed, the output voltage of the alternator 12 is also lowered with time, since the rotation speed of the engine 10 is lowered with lapse of a certain time.

Figure 2:
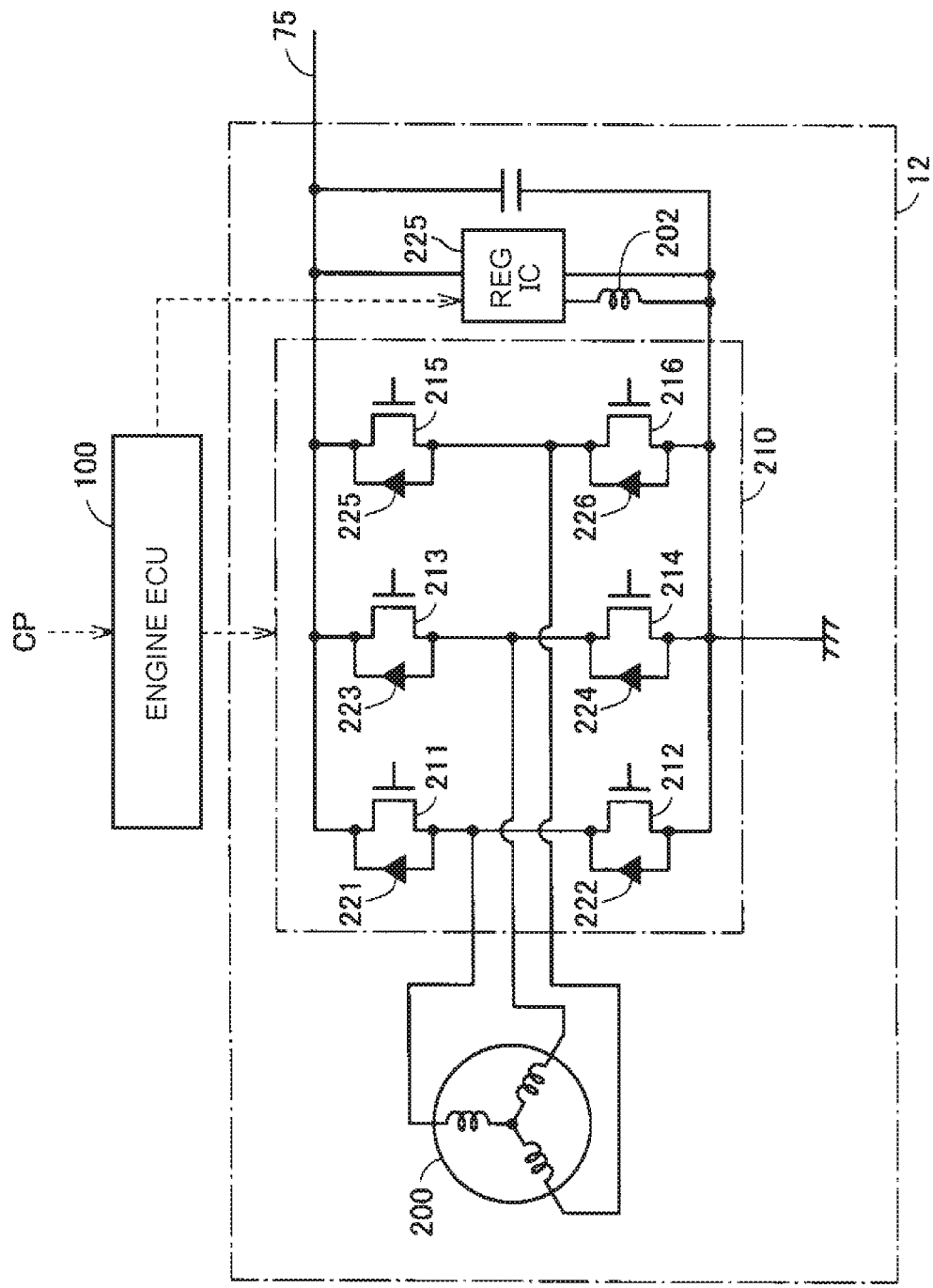
FIG. 2 is a diagram showing the configuration of an alternator shown in FIG. 1.

FIG. 2 is a diagram showing the configuration of the alternator 12 shown in FIG. 1. Referring to FIG. 2, the alternator 12 includes an AC electric power generator 200, an inverter 210, and a regulator IC 225.

A rotational shaft of the AC electric power generator 200 is connected to the crankshaft 17 (FIG. 1) of the engine 10 by a pulley and a belt (not shown), and rotates in interlocking with the crankshaft 17 of the engine 10. A field winding 202 in which a field current is controlled by the regulator IC 225 is provided in a rotor (not shown) of the AC electric power generator 200, and if the rotor with the field current flowing in the field winding 202 rotates along with the rotational shaft of the AC electric power generator 200, an AC voltage is generated in a stator coil.

The inverter 210 includes switching elements 211 to 216 and diodes 221 to 216. Each of the switching elements 211 to 216 is constituted of, for example, a metal oxide semiconductor field effect transistor (MOSFET). The diodes 221 to 216 are respectively connected in reversely parallel with the switching elements 211 to 216.

At the time of normal electric power generation using the output of the engine 10, the inverter 210 functions as a rectifier circuit by turning off all of the switching elements 211 to 216 of the upper arm and the lower arm, rectifies AC electric power generated by the AC electric power generator 200, and outputs AC electric power to the low-voltage system electric power line 75. When the crank position stop control is executed when the engine 10 is stopped, all of the switching elements 211, 213, 215 of the upper arm are turned off and the on/off of the switching elements 212, 214, 216 of the lower arm is controlled in full phases simultaneously based on a control signal from the engine ECU 100. Hereinafter, this control is referred to as "lower arm full-phase control". With the lower arm full-phase control, the braking torque is compulsorily generated in the AC electric power generator 200, and the on/off of the lower arm is controlled as appropriate based on the detection value of the crank position (crank angle), whereby it is possible to regulate the magnitude of the braking torque to stop the crank at a desired position.

Figure 3:
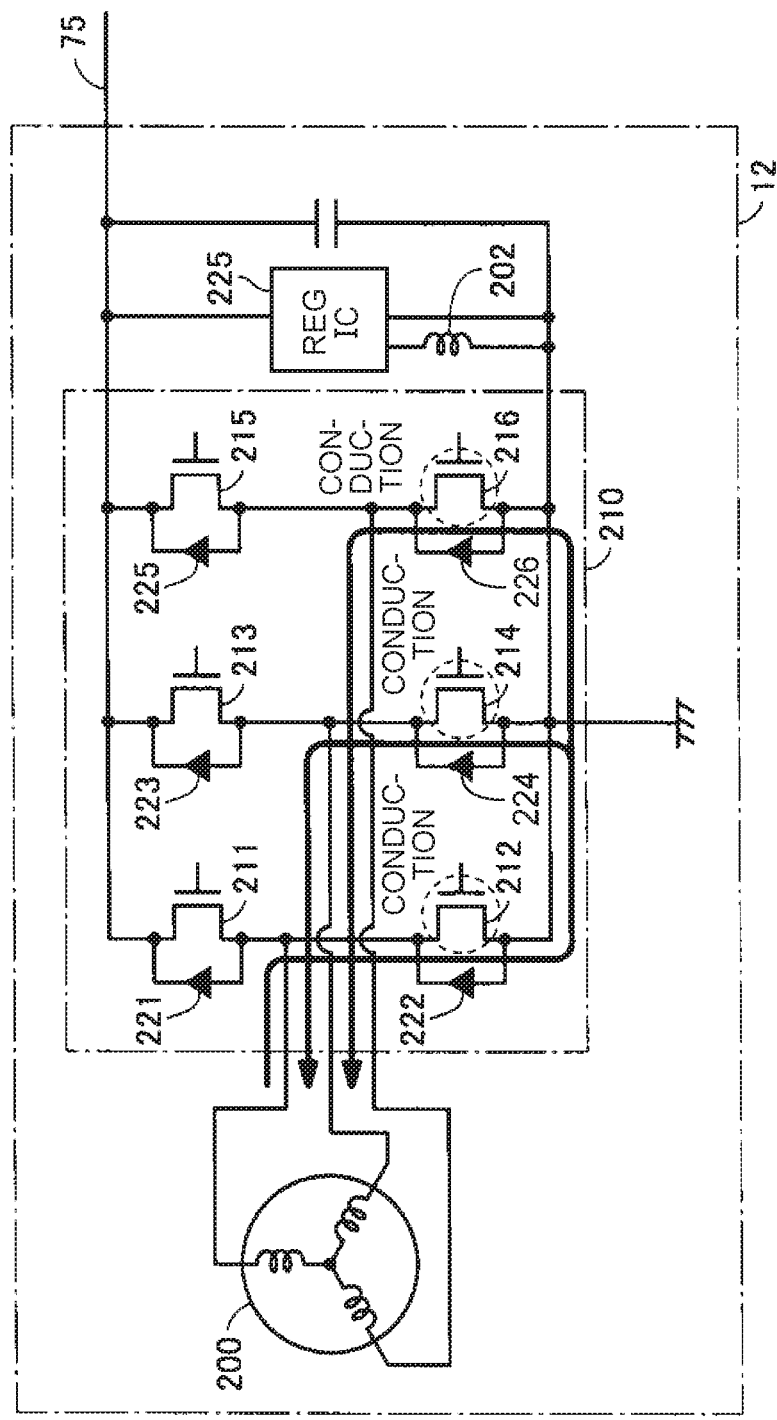
FIG. 3 is a diagram showing an example of a path of a current flowing in the alternator at the time of execution of lower arm full-phase control.

FIG. 3 is a diagram showing an example of a path of a current flowing in the alternator 12 at the time of the execution of the lower arm full-phase control. Referring to FIG. 3, when a counter electromotive voltage is generated in the AC electric power generator 200 by the rotation of the AC electric power generator 200, if all of the switching elements 211, 213, 215 of the upper arm are turned off (shutoff), and all of the switching elements 212, 214, 216 of the lower arm are turned on (conduction), for example, a circulating current indicated by a bold arrow flows in the alternator 12, and regenerative torque (braking torque) is generated in the AC electric power generator 200. Braking is applied to the crankshaft 17 using the braking torque when the engine 10 is stopped. The switching elements 212, 214, 216 of the lower arm are turned on/off simultaneously as appropriate, whereby it is possible to regulate the braking torque of the AC electric power generator 200 and to stop the crankshaft 17 at a desired crank position (crank angle) (crank position stop control).

Referring to FIG. 2 again, the regulator IC 225 regulates a voltage output from the AC electric power generator 200 to the electric power line 75 through the inverter 210 based on the instruction voltage from the engine ECU 100. In more detail, the regulator IC 225 receives the first instruction voltage indicating the target output voltage of the alternator 12 from the engine ECU 100, and controls the field current of the field winding 202 provided in the rotor of the AC electric power generator 200, thereby regulating the output voltage of the alternator 12 to the first instruction voltage. For the regulator IC 225, an equivalent to a regulator IC generally provided in a known alternator can be used.

In the above description, although, at the time of the execution of the lower arm full-phase control, the braking torque of the AC electric power generator 200 is regulated by turning on/off the switching elements 212, 214, 216 of the lower arm in full phases simultaneously as appropriate, the braking torque of the AC electric power generator 200 may be regulated by bringing all of the switching elements 212, 214, 216 of the lower arm into the on state and controlling the field current of the AC electric power generator 200 by the regulator IC 225.

In this way, the lower arm full-phase control of the alternator 12 is executed when the engine 10 is stopped, whereby the braking torque can be compulsorily generated in the AC electric power generator 200. If the lower arm full-phase control is executed, since the rotation speed of the AC electric power generator 200 is rapidly lowered due to the braking torque, the output voltage of the alternator 12 is rapidly lowered. If the output voltage of the alternator 12 is rapidly lowered, the voltage (accessory voltage) of the electric power line 75 is likely to be rapidly lowered. That is, if the crank position stop control is executed, the voltage (accessory voltage) of the electric power line 75 is likely to rapidly fluctuate.

Figure 4:
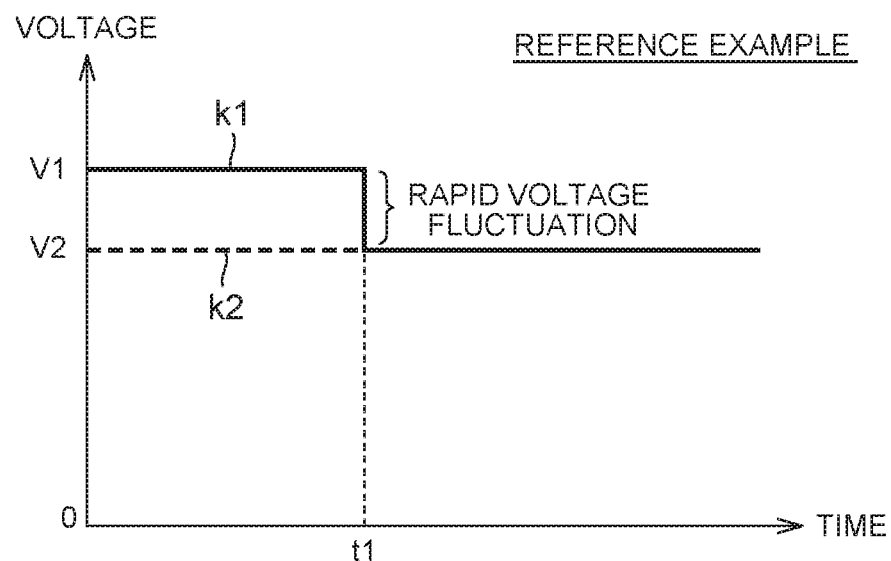
FIG. 4 is a reference diagram showing that an accessory voltage can fluctuate rapidly with execution of crank position stop control.

FIG. 4 is a reference diagram showing that the accessory voltage can rapidly fluctuate with the execution of the crank position stop control. Referring to FIG. 4, a solid line k1 indicates the accessory voltage, a dotted line k2 indicates the target output voltage (second instruction voltage) of the DC/DC converter.

At a time t1, it is assumed that the crank position stop control is executed based on a stop instruction of the engine. Before the crank position stop control is executed, when the first instruction voltage (the target output voltage of the alternator) is a voltage V1 and the second instruction voltage (the target output voltage of the DC/DC converter) is a voltage V2 (V2<V1), the accessory voltage becomes the voltage V1 according to the first instruction voltage corresponding a higher voltage out of the first and second instruction voltages.

If the crank position stop control is executed at the time t1 in such a situation, the output voltage of the alternator is rapidly lowered by executing the lower arm full-phase control, and the accessory voltage is rapidly lowered from the voltage V1 to the voltage V2. That is, if the first instruction voltage is higher than the second instruction voltage at the time of the execution of the crank position stop control, rapid fluctuation (lowering) of the accessory voltage occurs.

Figure 5:
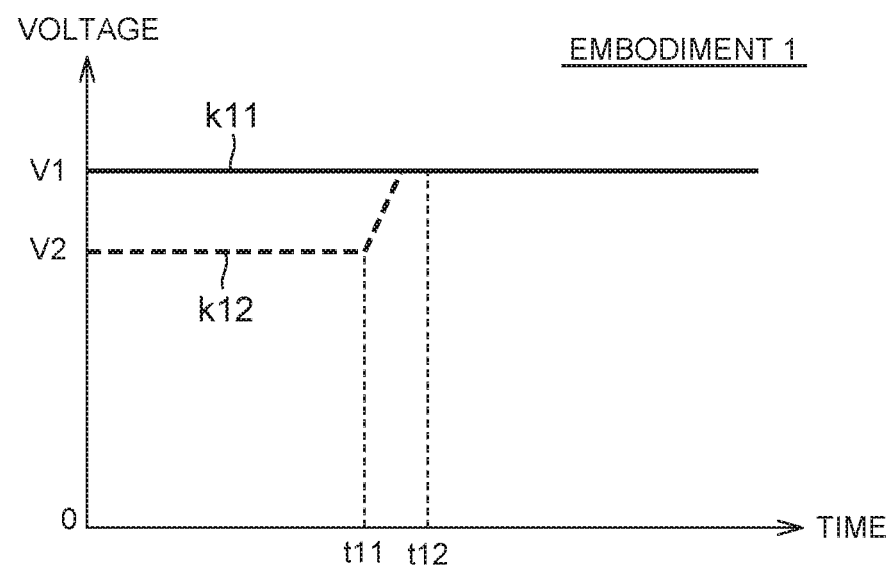
FIG. 5 is a diagram showing transition of the accessory voltage before and after the execution of the crank position stop control in the vehicle according to Embodiment 1.

FIG. 5 is a diagram showing transition of the accessory voltage before and after the execution of the crank position stop control in the vehicle 1 according to Embodiment 1. Referring to FIG. 5, a solid line k11 indicates the voltage (accessory voltage) of the electric power line 75, and a dotted line k12 indicates the target output voltage (second instruction voltage) of the DC/DC converter 70.

Before the time t11, it is assumed that the first instruction voltage (the target output voltage of the alternator 12) is the voltage V1, and the second instruction voltage (the target output voltage of the DC/DC converter 70) is the voltage V2 (V2<V1). The voltage of the electric power line 75 becomes the voltage V1 according to the first instruction voltage corresponding to a higher voltage out of the first and second instruction voltages.

At the time t11, it is assumed that the stop instruction of the engine 10 is generated. At this time, since the second instruction voltage is not equal to or higher than the first instruction voltage, in the vehicle 1 according to Embodiment 1, the second instruction voltage increases to the voltage V1 of the first instruction voltage. In the drawing, although the second instruction voltage increases at a rate, such a rate may not be provided. Since the voltage (accessory voltage) of the electric power line 75 is the voltage V1 according to the first instruction voltage corresponding to a higher voltage out of the first and second instruction voltages, fluctuation of the voltage of the electric power line 75 due to the increase in the second instruction voltage from the voltage V2 to the voltage V1 does not occur.

After the second instruction voltage increases to the voltage V1 of the first instruction voltage (in a state in which the second instruction voltage is equal to or higher than the first instruction voltage), at a time t12, the crank position stop control is executed. With this, even if the output voltage of the alternator 12 is rapidly lowered from the voltage V1 due to the crank position stop control, the voltage of the electric power line 75 is controlled to the voltage V1 by the DC/DC converter 70. That is, even if the output voltage of the alternator 12 is rapidly lowered due to the crank position stop control, the voltage of the electric power line 75 is not lowered. Therefore, according to the vehicle 1, fluctuation in the voltage (accessory voltage) of the electric power line 75 accompanied by the crank position stop control is suppressed.

When the stop of the engine 10 is instructed, when the second instruction voltage is equal to or higher than the first instruction voltage, the crank position stop control is executed without changing the second instruction voltage as described above.

Figure 6:
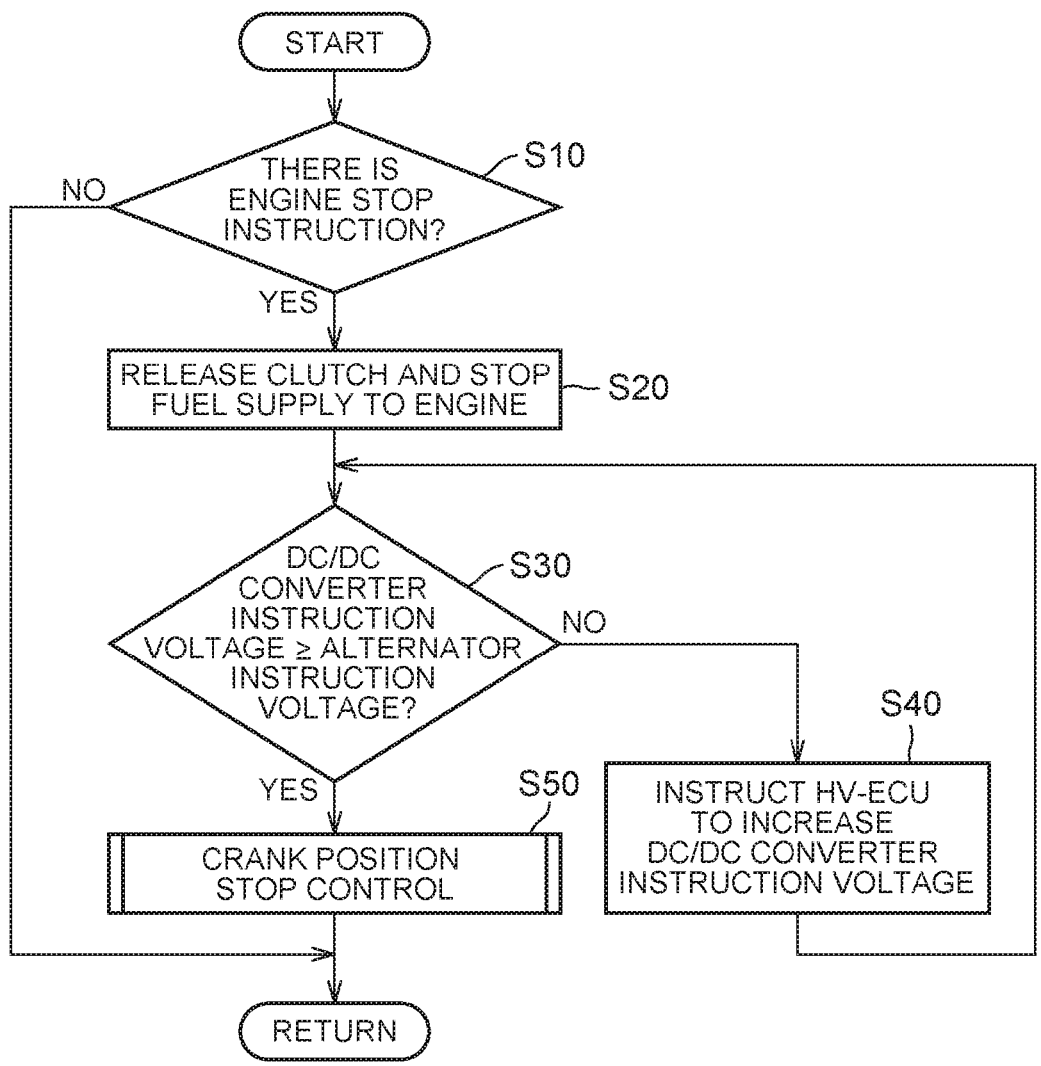
FIG. 6 is a flowchart illustrating a procedure of processing which is executed by an engine ECU.

FIG. 6 is a flowchart illustrating a procedure of processing which is executed by the engine ECU 100. The process shown in the flowchart is called from a main routine and executed at every predetermined time or when predetermined conditions are established.

Referring to FIG. 6, the engine ECU 100 determines whether or not there is the stop instruction of the engine 10 (Step S10). It is determined whether to stop or to operate the engine 10 by the HV-ECU 110, for example, according to a user's operation on the accelerator, the SOC of the electric power storage device 50, or the like. If an engine stop command is received from the HV-ECU 110, the engine ECU 100 determines that there is the stop instruction of the engine 10.

When it is determined that there is no stop instruction of the engine 10 (in Step S10, NO), the engine ECU 100 progresses the process to RETURN without executing a sequence of subsequent processing.

In Step S10, if it is determined that there is the stop instruction of the engine 10 (in Step S10, YES), the engine ECU 100 releases the clutch 18 (FIG. 1), and stops fuel supply to the engine 10 in order to stop the engine 10 (Step S20).

Next, the engine ECU 100 determines whether or not the instruction voltage (second instruction voltage) of the DC/DC converter 70 (FIG. 1) is equal to or higher than the instruction voltage (first instruction voltage) of the alternator 12 (Step S30). The instruction voltage (second instruction voltage) of the DC/DC converter 70 is acquired from the HV-ECU 110.

If it is determined that the instruction voltage (second instruction voltage) of the DC/DC converter 70 is lower than the instruction voltage (first instruction voltage) of the alternator 12 (in Step S30, NO), the engine ECU 100 outputs an instruction to the HV-ECU 110 to increase the instruction voltage (second instruction voltage) of the DC/DC converter 70 (Step S40). This is because, if the crank position stop control is executed in a state in which the instruction voltage (second instruction voltage) of the DC/DC converter 70 is lower than the instruction voltage (first instruction voltage) of the alternator 12, as described referring to FIG. 4, the voltage (accessory voltage) of the electric power line 75 is rapidly lowered accompanied by the execution of the crank position stop control.

If the instruction is output to the HV-ECU 110 in Step S40, the engine ECU 100 returns the process to Step S30, and determines again whether or not the instruction voltage (second instruction voltage) of the DC/DC converter 70 is equal to or higher than the instruction voltage (first instruction voltage) of the alternator 12.

Then, it is determined in Step S30 that the instruction voltage (second instruction voltage) of the DC/DC converter 70 is equal to or higher than the instruction voltage (first instruction voltage) of the alternator 12 (in Step S30, YES), the engine ECU 100 executes the crank position stop control using the alternator 12 (Step S50).

Figure 7:
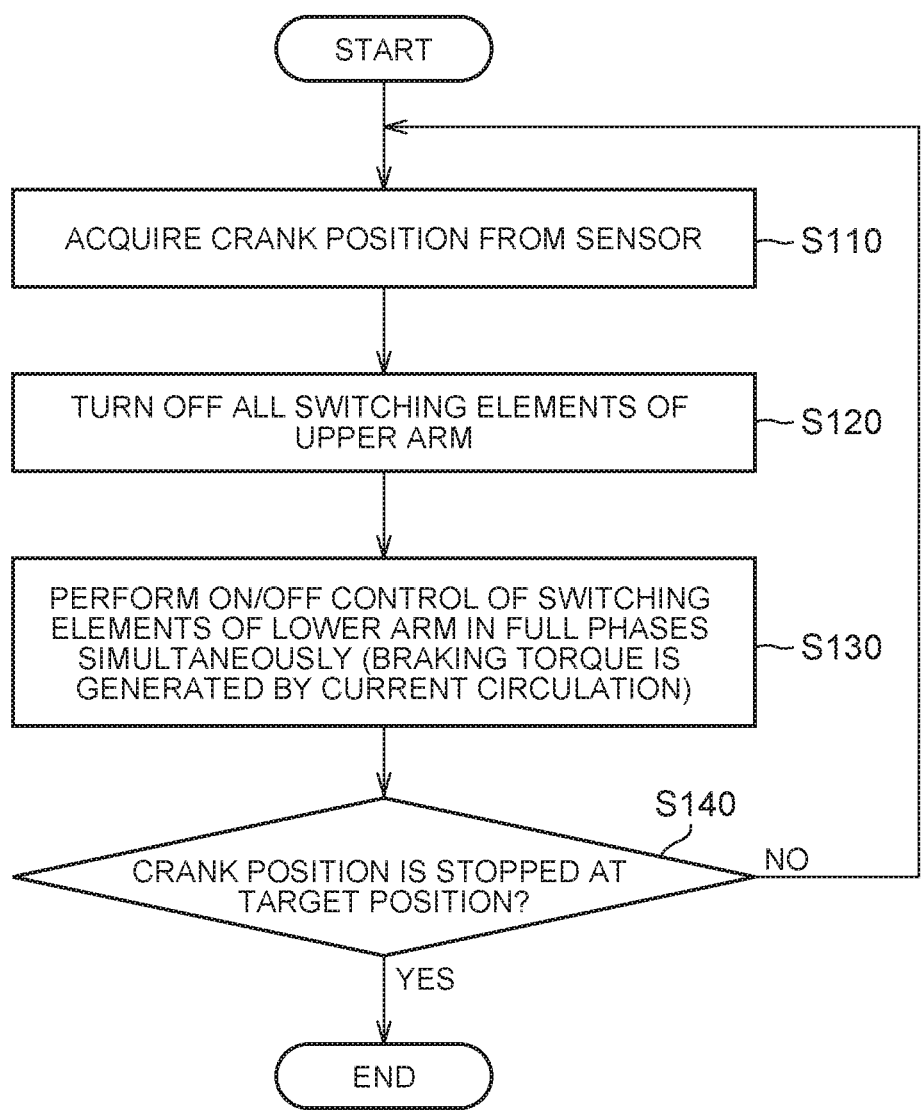
FIG. 7 is a flowchart illustrating a processing procedure of the crank position stop control which is executed in Step S50 of FIG. 6.

FIG. 7 is a flowchart illustrating a processing procedure of the crank position stop control which is executed in Step S50 of FIG. 6. Referring to FIG. 7, the engine ECU 100 acquires the crank position CP indicating the rotation position (rotation angle) of the crankshaft 17 from the crank position sensor 16 (Step S110).

Next, the engine ECU 100 turns off all of the switching elements 211, 213, 215 of the upper arm of the inverter 210 (FIG. 2) (Step S120). In addition, the engine ECU 100 controls the on/off of the switching elements 212, 214, 216 of the lower arm of the inverter 210 in full phases simultaneously (Step S130). Therefore, as shown in FIG. 3, the circulating current flows in the alternator 12, and the braking torque is generated in the alternator 12. The on/off of the switching elements 212, 214, 216 of the lower arm is controlled in full phases simultaneously as appropriate, whereby it is possible to regulate the magnitude of the braking torque to stop the crank position at a desired position.

Subsequently, the engine ECU 100 determines whether or not the crank of the engine 10 is stopped at a predetermined target position based on the crank position CP acquired in Step S110 (Step S140). The target position is set in advance as a crank position where startability of the engine 10 increases. When the crank is not stopped at the target position (in Step S140, NO), the process returns to Step S110, and the lower arm full-phase control is continued.

Then, if it is determined in Step S140 that the crank is stopped at the target position (in Step S140, YES), the process progresses to END, and the crank position stop control ends.

As described above, according to Embodiment 1, the crank position stop control is executed in a state in which the second instruction voltage (the target output voltage of the DC/DC converter 70) is equal to or higher than the first instruction voltage (the target output voltage of the alternator 12). Therefore, even if the output voltage of the alternator 12 is rapidly lowered by the start of the crank position stop control, the voltage (accessory voltage) of the electric power line 75 is not lowered. Therefore, according to Embodiment 1, it is possible to suppress fluctuation of the accessory voltage by the crank position stop control.

In Embodiment 1, when the first instruction voltage is higher than the second instruction voltage before executing the crank position stop control, the crank position stop control is executed after the relatively lower second instruction voltage increases to the first instruction voltage. Therefore, it is possible to suppress fluctuation of the accessory voltage by change in the second instruction voltage before executing the crank position stop control.

Modification Example 1

In Embodiment 1 described above, although, in a case where the stop of the engine 10 is instructed, when the instruction voltage (first instruction voltage) of the alternator 12 is higher than the instruction voltage (second instruction voltage) of the DC/DC converter 70, the second instruction voltage increases to the first instruction voltage, the first instruction voltage may be lowered to the second instruction voltage.

Figure 8:
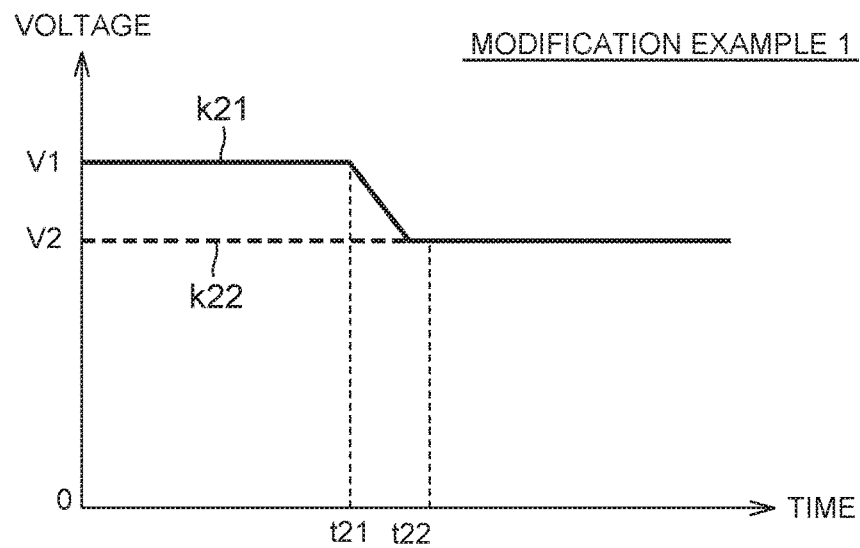
FIG. 8 is a diagram showing transition of an accessory voltage before and after execution of crank position stop control in a vehicle according to Modification Example 1.

FIG. 8 is a diagram showing transition of an accessory voltage before and after execution of crank position stop control in a vehicle 1 according to Modification Example 1. Referring to FIG. 8, a solid line k21 indicates the voltage (accessory voltage) of the electric power line 75, and a dotted line k22 indicates the target output voltage (second instruction voltage) of the DC/DC converter 70.

Before a time t21, it is assumed that the first instruction voltage (the target output voltage of the alternator 12) is the voltage V1, and the second instruction voltage (the target output voltage of the DC/DC converter 70) is the voltage V2 (V2<V1). The voltage of the electric power line 75 becomes the voltage V1 according to the first instruction voltage corresponding to a higher voltage out of the first and second instruction voltages.

At the time t21, it is assumed that the stop instruction of the engine 10 is generated. At this time, since the second instruction voltage is not equal to or higher than the first instruction voltage, in Modification Example 1, the first instruction voltage decreases to be equal to or lower than the second instruction voltage (hereinafter, description will be provided assuming that the first instruction voltage decreases to the voltage V2 of the second instruction voltage). If the first instruction voltage is rapidly lowered, since the voltage of the electric power line 75 is rapidly lowered with the lowering of the first instruction voltage, the first instruction voltage decreases at a rate to such an extent that the voltage of the electric power line 75 is not rapidly lowered.

Then, after the first instruction voltage decreases to the voltage V2 of the second instruction voltage (in a state in which the second instruction voltage is equal to or higher than the first instruction voltage), at a time t22, the crank position stop control is executed. Therefore, even if the output voltage of the alternator 12 is rapidly lowered from the voltage V2 due to the crank position stop control, the voltage of the electric power line 75 is controlled to the voltage V2 by the DC/DC converter 70, and thus, is not lowered. Therefore, even in Modification Example 1, fluctuation of the voltage (accessory voltage) of the electric power line 75 by the crank position stop control is suppressed.

Figure 9:
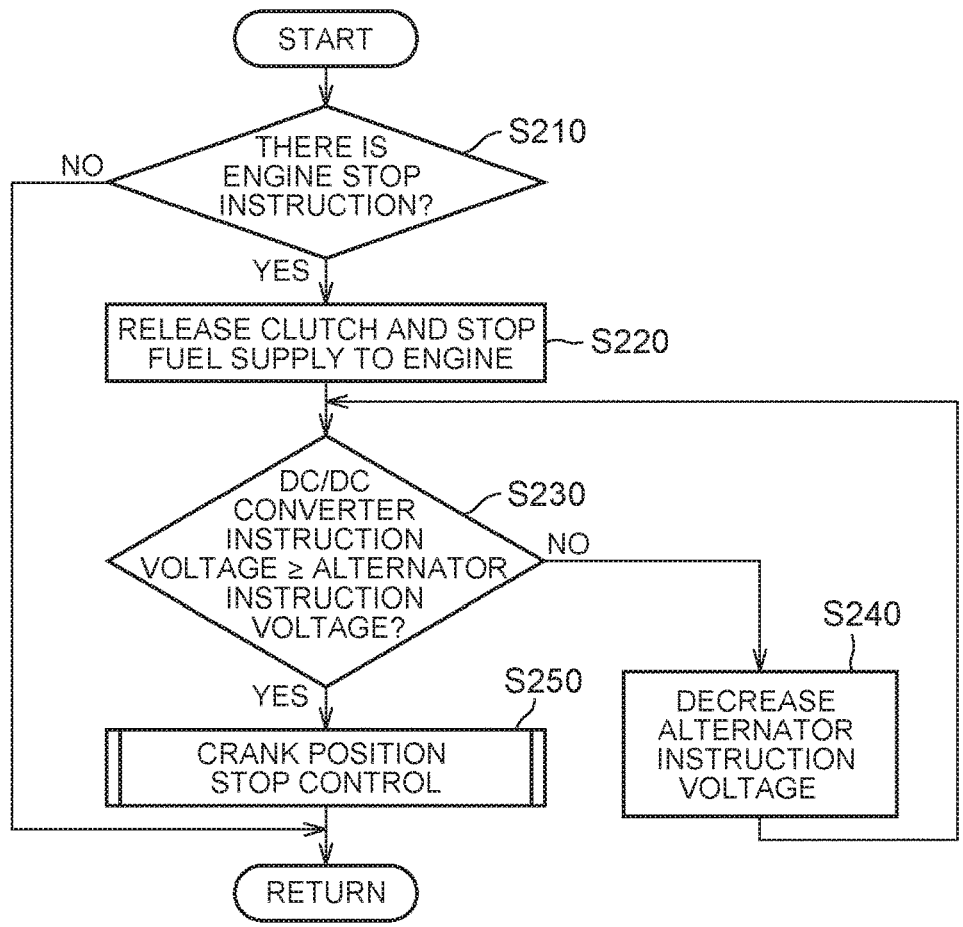
FIG. 9 is a flowchart illustrating a procedure of processing which is executed by an engine ECU in Modification Example 1.

FIG. 9 is a flowchart illustrating a procedure of processing which is executed by the engine ECU 100 in Modification Example 1. The process shown in the flowchart is called from the main routine and executed at every predetermined time or when predetermined conditions are established.

Referring to FIG. 9, Steps S210 to S230 and S250 shown in flowchart are the same as Steps S10 to S30 and S50 shown in the flowchart of Embodiment 1 shown in FIG. 6.

In the vehicle 1 according to Modification Example 1, if it is determined that the instruction voltage (second instruction voltage) of the DC/DC converter 70 is lower than the instruction voltage (first instruction voltage) of the alternator 12 (in Step S230, NO), the engine ECU 100 decrease the instruction voltage (first instruction voltage) of the alternator 12 by a predetermined amount (Step S240). While the predetermined amount is set to a comparatively small value to such an extent that the voltage of the electric power line 75 is not rapidly lowered, the instruction voltage (first instruction voltage) of the alternator 12 may decrease by the predetermined amount at a rate.

In Step S240, if the instruction voltage (first instruction voltage) of the alternator 12 decreases by the predetermined amount, the engine ECU 100 returns the process to Step S230, it is determined again whether or not the instruction voltage (second instruction voltage) of the DC/DC converter 70 is equal to or higher than the instruction voltage (first instruction voltage) of the alternator 12.

Then, if it is determined in Step S230 that the instruction voltage (second instruction voltage) of the DC/DC converter 70 is equal to or higher than the instruction voltage (first instruction voltage) of the alternator 12 (in Step S230, YES), the engine ECU 100 progresses the process to Step S250 and executes the crank position stop control using the alternator 12.

Modification Example 2

In Embodiment 1 and Modification Example 1 described above, although the crank position stop control is implemented by executing the lower arm full-phase control (FIG. 3), control for implementing the crank position stop control is not limited to the lower arm full-phase control.

Figure 10:
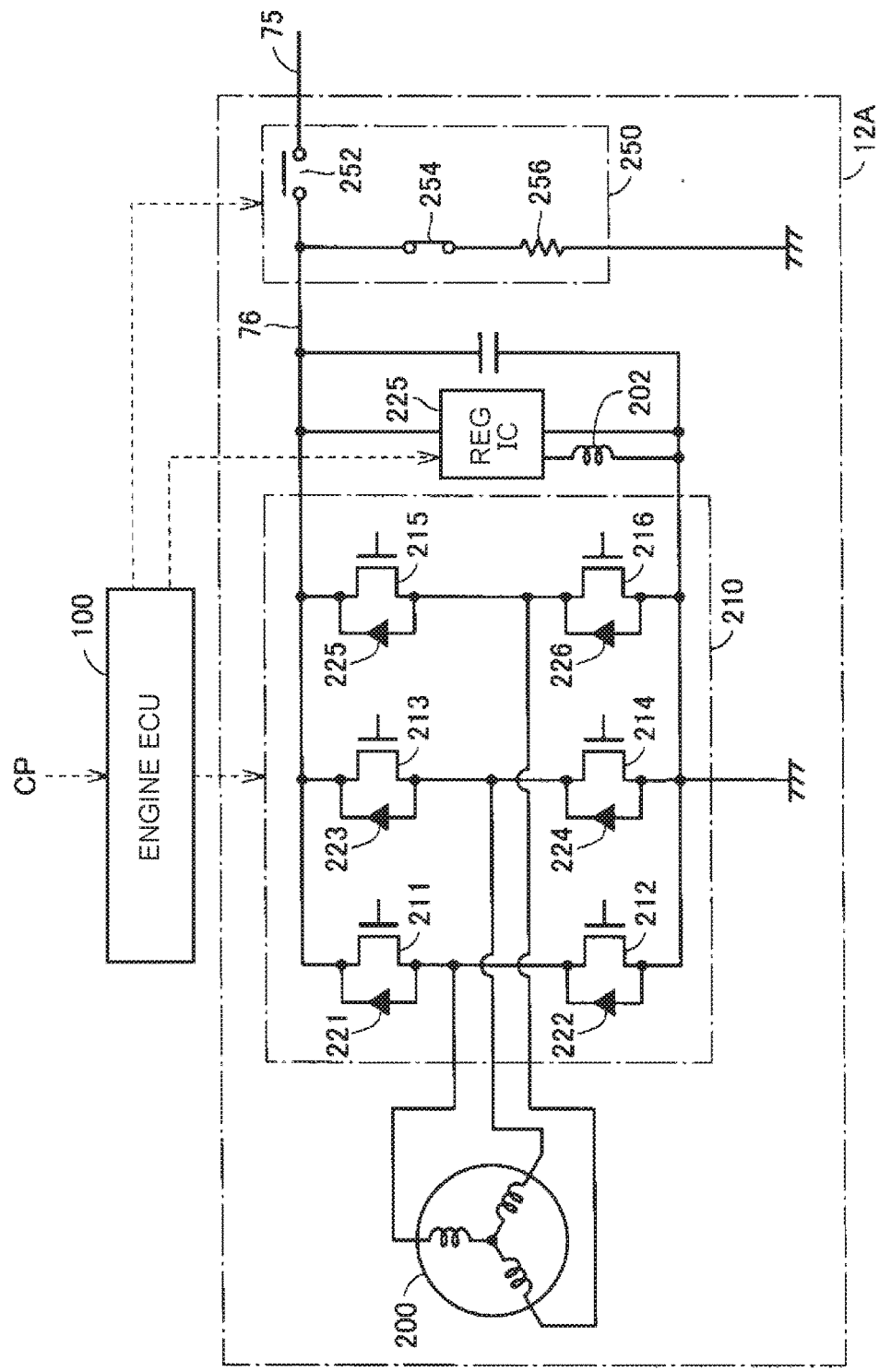
FIG. 10 FIG. 10 is a diagram showing the configuration of an alternator in Modification Example 2.

FIG. 10 is a diagram showing the configuration of an alternator in Modification Example 2. Referring to FIG. 10, an alternator 12A further includes a switching device 250 in the configuration of the alternator 12 shown in FIG. 2.

The switching device 250 includes relays 252, 254 and a resistor 256. The relay 252 is provided between the electric power line 75 and an electric power line 76 connected to the inverter 210 or the regulator IC 225. If the relay 252 is turned off (electric power shutoff), the alternator 12A is electrically disconnected from the electric power line 75. The relay 254 is connected between the electric power line 76 and a ground node. The resistor 256 is connected in series with the relay 254. The relay 254 operates complementarily with the relay 252. That is, when the relay 252 is turned on (conduction), the relay 254 is turned off, and when the relay 252 is turned off (electric power shutoff), the relay 254 is turned on.

The relays 252, 254 are respectively turned on or off, whereby electric power generated by the AC electric power generator 200 can be supplied to the low-voltage system electric power line 75 through the inverter 210. At the time of the execution of the crank position stop control, the relays 252, 254 are respectively turned on or off. Therefore, a circulating current can be generated in the alternator 12A, and braking torque can be generated in the AC electric power generator 200.

Figure 11:
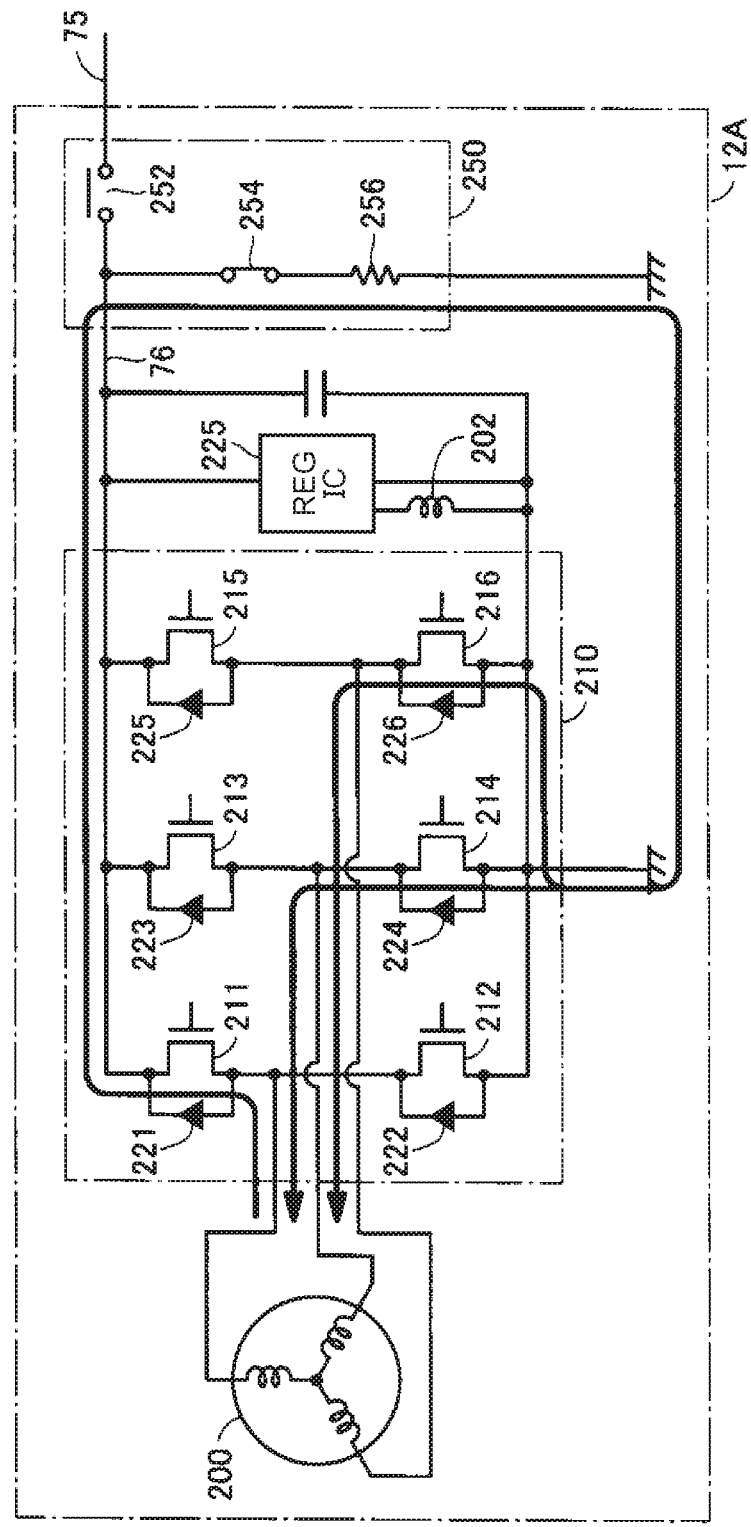
FIG. 11 is a diagram showing an example of a path of a current flowing in the alternator at the time of execution of crank position stop control in Modification Example 2.

FIG. 11 is a diagram showing an example of a path of a current flowing in the alternator 12A at the time of the execution of the crank position stop control in Modification Example 2. Referring to FIG. 10, when a counter electromotive voltage is generated in the AC electric power generator 200 by the rotation of the AC electric power generator 200, if the relays 252, 254 are respectively turned on or off, for example, a circulating current indicated by a bold arrow flows in the alternator 12A, and regenerative torque (braking torque) is generated in the AC electric power generator 200. Braking is applied to the crankshaft 17 of the engine 10 using the braking torque. Then, a field current of the AC electric power generator 200 is controlled by the regulator IC 225, whereby it is possible to regulate the braking torque of the AC electric power generator 200 and to stop the crankshaft 17 at a desired crank position (crank angle) (crank position stop control).

Figure 12:
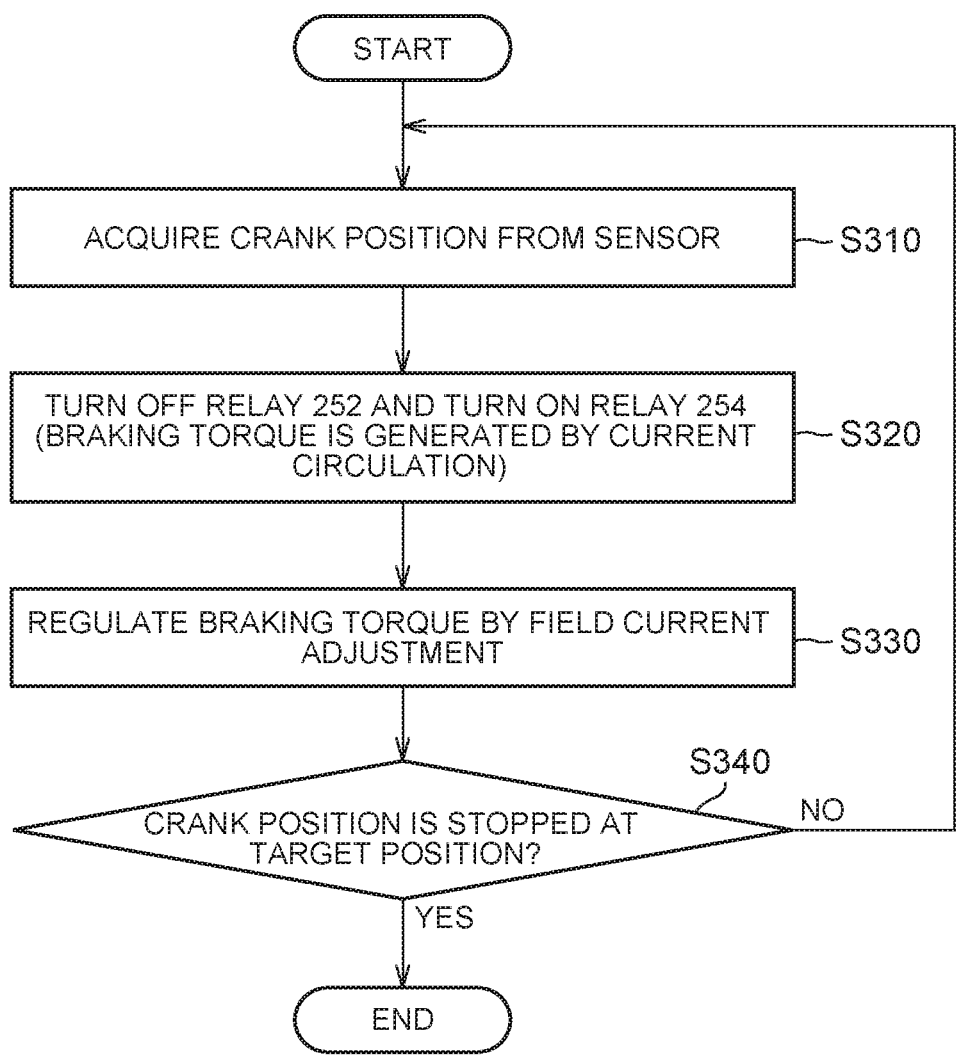
FIG. 12 is a flowchart illustrating a processing procedure of the crank position stop control in Modification Example 2.

FIG. 12 is a flowchart illustrating a processing procedure of the crank position stop control in Modification Example 2. The flowchart corresponds to the flowchart shown in FIG. 7. Referring to FIG. 12, the engine ECU 100 acquires the crank position CP indicating the rotation position (rotation angle) of the crankshaft 17 from the crank position sensor 16 (Step S310).

Next, the engine ECU 100 respectively turns on or off the relays 252, 254 (FIG. 10) (Step S320). With this, as shown in FIG. 11, the circulating current flows in the alternator 12A, and the braking torque for compulsorily stopping the engine 10 is generated in the alternator 12A.

The engine ECU 100 performs control such that the regulator IC 225 regulates the field current of the AC electric power generator 200, thereby regulating the magnitude of the braking torque (Step S330). With this, it is possible to regulate the magnitude of the braking torque to stop the crank at a desired position.

Subsequently, the engine ECU 100 determines whether or not the crank of the engine 10 is stopped at a predetermined target position based on the crank position CP acquired in Step S310 (Step S340). When the crank is not stopped at the target position (in Step S340, NO), the process returns to the Step S310.

Then, if it is determined in Step S340 that the crank is stopped at the target position (in Step S340, YES), the engine ECU 100 respectively turns on or off the relays 257, 254, and ends a sequence of processing.

Modification Example 3

Figure 13:
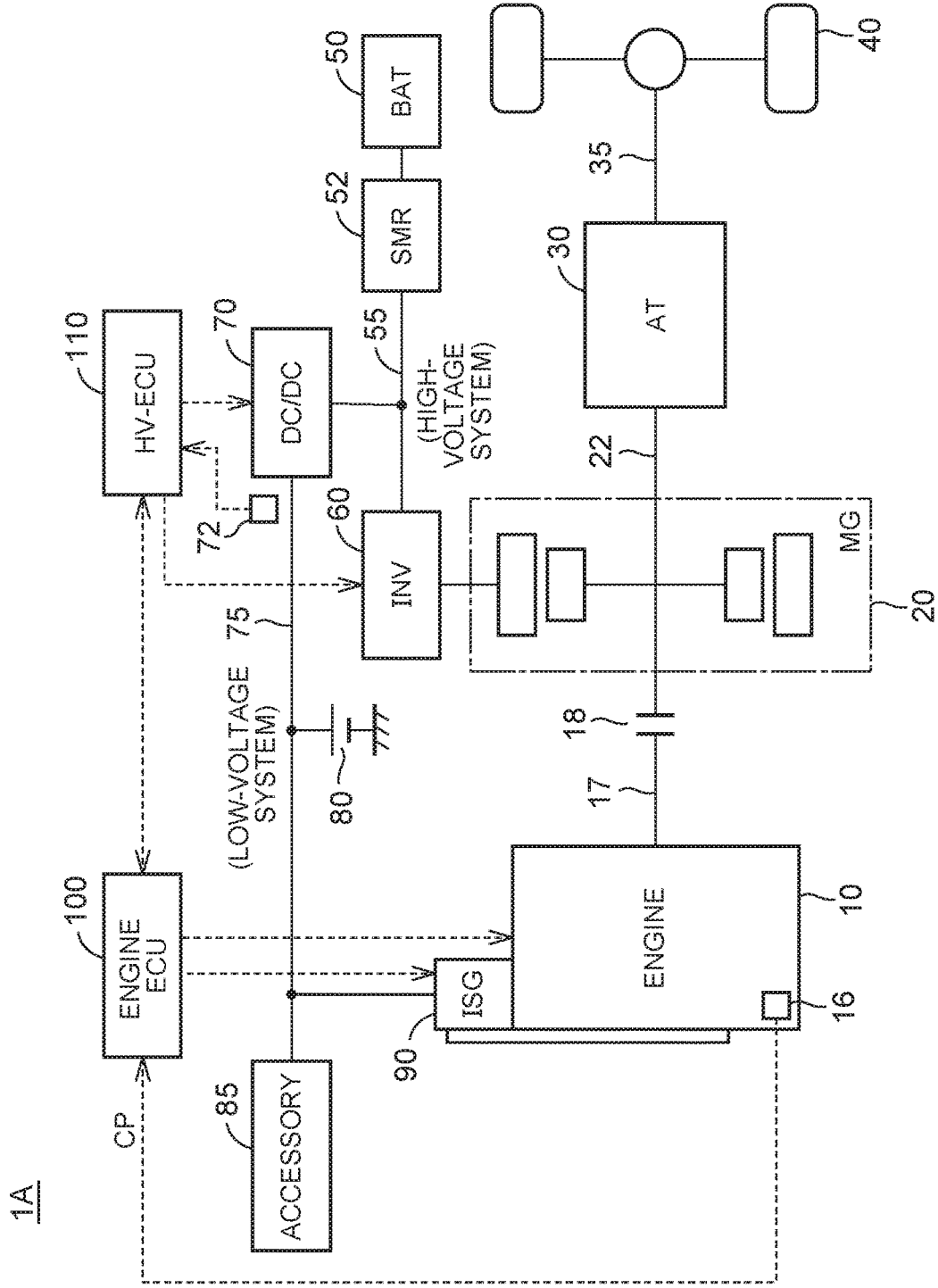
FIG. 13 is an overall configuration diagram of a vehicle according to Modification Example 3.

In Embodiment 1 and Modification Examples 1 and 2 described above, although torque is received from the crankshaft 17 of the engine 10 and accessory electric power is produced using the alternator 12 (12A), and when the engine 10 is stopped, the crank position stop control is executed, as shown in FIG. 13, an integrated starter generator (ISG) 90 may be used instead of the alternator 12 (12A).

The ISG 90 is connected to the crankshaft 17 of the engine 10 through a belt (such an ISG is referred to as a "belt type ISG"). The ISG 90 has the function of the alternator, and has a function as a starter at the time of the start of the engine 10 and an assist function of traveling torque. Since the ISG 90 has the function as a starter, a vehicle 1A does not include the starter 14 provided in the vehicle 1 shown in FIG. 1.

Similarly to the alternators 12, 12A shown in FIGS. 2 and 10, the ISG 90 includes an AC rotating electric machine (motor generator) which has an electric power generation function, and an inverter (not shown) which drives the AC rotating electric machine. Therefore, even in the vehicle 1A which includes the ISG 90 instead of the alternator 12 (12A), it is possible to implement the same functions as those in the vehicle 1 according to Embodiment 1 or Modification Examples 1 and 2 described above.

Embodiment 2

In Embodiment 1 and the respective modification examples described above, although the vehicles 1, 1A are hybrid vehicles which include the engine 10 and the MG 20 as a power source, the disclosure is not limited to the hybrid vehicle, and can be applied to a vehicle which does not include the MG 20 or the electric power storage device 50.

Figure 14:
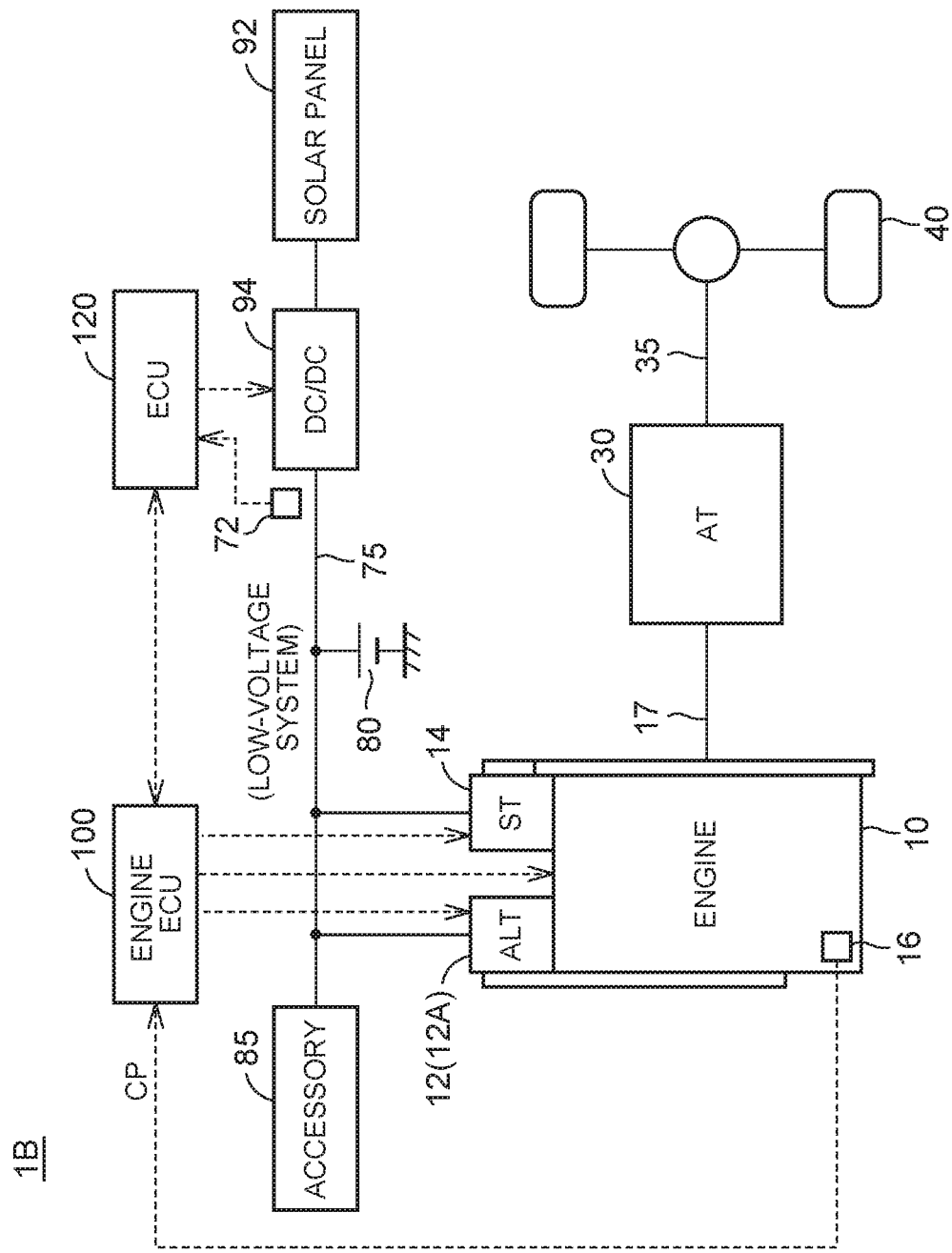
FIG. 14 is an overall configuration diagram of a vehicle according to Embodiment 2.

FIG. 14 is an overall configuration diagram of a vehicle according to Embodiment 2. Referring to FIG. 14, a vehicle 1B includes an engine 10, an alternator 12, a starter 14, a crank position sensor 16, an AT 30, and drive wheels 40. The vehicle 1B further includes an accessory battery 80, an accessory 85, a voltage sensor 72, a solar panel 92, a DC/DC converter 94, an engine ECU 100, and an ECU 120.

The solar panel 92 is provided, for example, on a roof of the vehicle 1B, and receives sunlight to generate electric power. The solar panel 92 outputs the generated electric power to the DC/DC converter 94. The DC/DC converter 94 is connected between the solar panel 92 and the electric power line 75, and receives electric power from the solar panel 92 to produce accessory electric power. Specifically, the DC/DC converter 94 converts electric power received from the solar panel 92 to electric power subjected to voltage regulated to an instruction voltage (for example, 12 V to 15 V) received from the ECU 120 and outputs electric power to the electric power line 75. The DC/DC converter 94 is, for example, an insulating converter including a DC/AC conversion circuit, a transformer, a rectifier circuit, and a smoothing circuit.

The ECU 120 includes a CPU, a ROM which stores a processing program or the like, a RAM which temporarily stores data, an input/output port which is provided to input and output various signals, and the like (all are not shown). The ECU 120 controls the DC/DC converter 94 such that accessory electric power is supplied from the solar panel 92 to the electric power line 75 through the DC/DC converter 94. The ECU 120 sets an instruction voltage (hereinafter, referred to as a "third instruction voltage") indicating the target output voltage of the DC/DC converter 94 and outputs the third instruction voltage to the DC/DC converter 94. The third instruction voltage is set as appropriate according to a load state of the accessory 85 or the like such that conversion efficiency of the DC/DC converter 94 becomes satisfactory.

Even in Embodiment 2, in a state in which the third instruction voltage (the target output voltage of the DC/DC converter 94) is equal to or higher than the first instruction voltage (the target output voltage of the alternator 12), the crank position stop control is executed by the engine ECU 100.

Even in Embodiment 2, when the first instruction voltage is higher than the third instruction voltage before the crank position stop control is executed, the third instruction voltage increases to the first instruction voltage by the ECU 120, or the first instruction voltage decreases to be equal to or lower than the third instruction voltage at a rate by the engine ECU 100. Then, in a state in which the third instruction voltage is equal to or higher than the first instruction voltage, the crank position stop control is executed by the engine ECU 100.

The vehicle 19 does not include the electric power storage device 50, the SMR 52, the inverter 60, the MG 20, and the like provided in the vehicle 1 shown in FIG. 1. Other configurations of the vehicle 1B are the same as those in the vehicle 1.

The above-described control by the ECU 120 is executed when an output voltage of the solar panel 92 is higher than a predetermined operation threshold, and when the output voltage of the solar panel 92 is equal to or lower than the operation threshold, such as the nighttime, the above-described control by the ECU 120 is not executed.

According to Embodiment 2, when the output voltage of the solar panel 92 is higher than the operation threshold and accessory electric power is produced by the solar panel 92 and the DC/DC converter 94, it is possible to obtain the same effects as those in Embodiment 1 described above.

In Embodiment 2 described above, although the solar panel 92 and the DC/DC converter 94 are provided instead of the DC/DC converter 70 and the electric power storage device 50 constituting an accessory electric power supply different from the alternator 12 in Embodiment 1, an accessory electric power supply different from the alternator 12 may be an alternator (not shown) which is connected to the rotational shaft (can be disconnected from the crankshaft 17 by the clutch 18) of the AT 30, not to the crankshaft 17 of the engine 10, and produce accessory electric power using the torque of the drive wheels 40.

Though not particularly shown, even in the configuration of Embodiment 2, as in Modification Example 3 described above, the ISG 90 may be provided instead of the alternator 12 (12A).

In Embodiment 1 and the respective modification examples described above, although the vehicles 1, 1A include the single MG 20, when the disclosure is applied to a hybrid vehicle, the disclosure is not limited to a hybrid vehicle including a single MG, and can also be applied to a hybrid vehicle including two or more MGs.

In the above description, the alternators 12, 12A correspond to an example of a "first electric power generation device", and the AC electric power generator 200 corresponds to an example of a "rotating electric machine". The ISG 90 also corresponds to an example of a "first electric power generation device". In addition, the DC/DC converter 70 and the electric power storage device 50 correspond to an example of a "second electric power generation device", and the solar panel 92 and the DC/DC converter 94 also correspond to an example of a "second electric power generation device". When an alternator connected to the rotational shaft of the AT 30 is provided, the alternator can also correspond to an example of a "second electric power generation device". In addition, the engine ECU 100 corresponds to an example of a "electric control unit", and the MG 20 corresponds to an example of an "electric motor".

The respective embodiments disclosed herein are intended to be implemented in combination as appropriate as long as there is no contradiction. The embodiments disclosed herein are to be considered merely illustrative and not restrictive in all respects. The scope of the disclosure is defined by the terms of the claims, rather than the above description of the embodiments, and is intended to include any modifications within the scope and meaning equivalent to the terms of the claims.

What is claimed is:

1. A vehicle comprising:
an engine;
a first electric power generation device including a rotating electric machine connected to a crankshaft of the engine, the first electric power generation device being configured to produce an accessory voltage according to a first instruction voltage, using torque that the rotating electric machine receives from the crankshaft;
a second electric power generation device configured to produce the accessory voltage according to a second instruction voltage using a voltage source different from the rotating electric machine without using the torque of the crankshaft; and
an electric control unit configured to execute crank position stop control for stopping the crankshaft of the engine at a target position when the engine is stopped by controlling the first electric power generation device such that a current is circulated in the first electric power generation device and the rotating electric machine generates braking torque,
wherein the electric control unit is configured to execute the crank position stop control in a state in which the second instruction voltage is equal to or higher than the first instruction voltage.

2. The vehicle according to claim 1, wherein the electric control unit is configured to, when the first instruction voltage is higher than the second instruction voltage before executing the crank position stop control, execute the crank position stop control after increasing the second instruction voltage to the first instruction voltage.

3. The vehicle according to claim 2, wherein the electric control unit is configured to, when the first instruction voltage is equal to or lower than the second instruction voltage before executing the crank position stop control, execute the crank position stop control without changing the second instruction voltage.

4. The vehicle according to claim 1, wherein the electric control unit is configured to, when the first instruction voltage is higher than the second instruction voltage before executing the crank position stop control, execute the crank position stop control after decreasing the first instruction voltage to be equal to or lower than the second instruction voltage at a predetermined rate.

5. The vehicle according to claim 4, wherein the electric control unit is configured to, when the first instruction voltage is equal to or lower than the second instruction voltage before executing the crank position stop control, execute the crank position stop control without changing the first instruction voltage.

6. The vehicle according to claim 1, further comprising:
an electric motor configured to produce drive power of the vehicle; and
an electric power storage device configured to store electric power supplied to the electric motor,
wherein the second electric power generation device includes a converter configured to deboost a voltage of electric power supplied from the electric power storage device to produce the accessory voltage.

7. A control method for a vehicle,
the vehicle including an engine, a first electric power generation device including a rotating electric machine connected to a crankshaft of the engine, the first electric power generation device being configured to produce an accessory voltage according to a first instruction voltage, using torque that the rotating electric machine receives from the crankshaft, a second electric power generation device configured to produce the accessory voltage according to a second instruction voltage using a voltage source different from the rotating electric machine without using the torque of the crankshaft, and an electronic control unit,
the control method comprising:
when the engine is stopped, determining, by the electronic control unit, whether or not the second instruction voltage is equal to or higher than the first instruction voltage; and
when the electronic control unit determines that the second instruction voltage is equal to or higher than the first instruction voltage, executing, by the electronic control unit, crank position stop control for stopping a crank of the engine at a target position when the engine is stopped by controlling the first electric power generation device such that a current is circulated in the first electric power generation device and the rotating electric machine generates braking torque.

* * * * *